J. L. DOUGHERTY.
FILLER CAP FOR TANKS.
APPLICATION FILED AUG. 14, 1919.
1,368,616.
Patented Feb. 15, 1921.
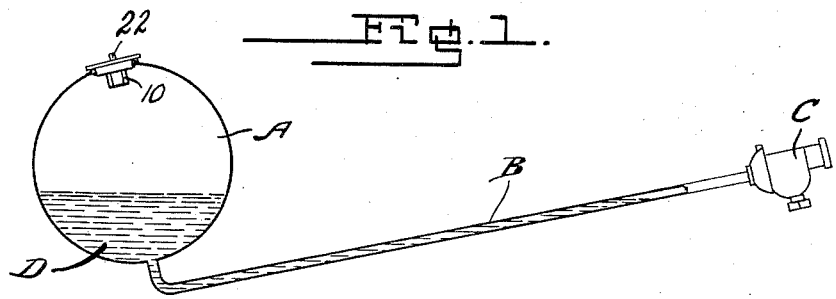
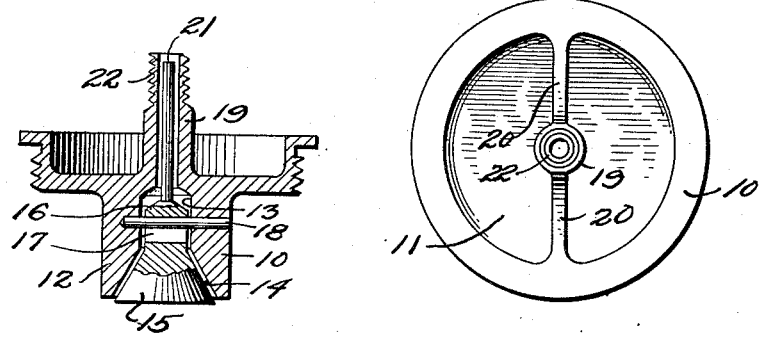
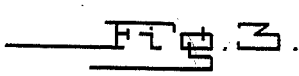
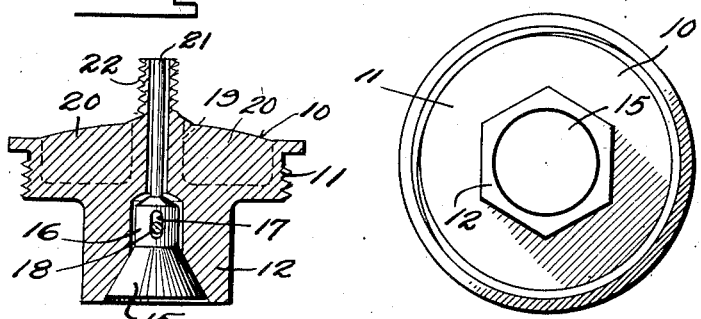
Inventor
John L. Dougherty

UNITED STATES PATENT OFFICE.

JOHN L. DOUGHERTY, OF ANACONDA, MONTANA, ASSIGNOR OF ONE-HALF TO FRANK C. MORAN, OF ANACONDA, MONTANA.

FILLER-CAP FOR TANKS.

1,368,616.     Specification of Letters Patent.     Patented Feb. 15, 1921.

Application filed August 14, 1919. Serial No. 317,516.

*To all whom it may concern:*

Be it known that I, JOHN L. DOUGHERTY, a citizen of the United States, residing at Anaconda, in the county of Deerlodge and State of Montana, have invented certain new and useful Improvements in Filler-Caps for Tanks, of which the following is a specification.

This invention relates to a combined valve and filler cap for the tanks of gravity fed fuel systems, and an object of the invention is to provide a filler plug as specified, by means of which air under pressure may be forced into the tank for forcing fuel therefrom.

A further object of the invention is to provide a combined filler plug and valve as specified, which is particularly designed for use in connection with the tanks of the fuel supply system of motor vehicles wherein the fuel is fed by gravity from the tank to the carbureter, and by means of which combined filler plugs and valves, air under pressure may be forced into the tank when the gasolene therein becomes relatively low and it is necessary to apply pressure to the gasolene to cause it to properly feed to the carbureter such as when climbing up an incline and also to provide a structure which will, when the air pressure within the tank recedes, automatically operate to permit the escape of air therefrom, to allow the feed to be maintained by gravity in its usual normal manner.

More specifically, the invention comprehends the provision of a filler plug for gasolene tanks of the gravity operated type of fuel systems, which includes a depending body portion forming a seat for a cone valve, the stem of which valve projects upwardly through a hollow stem carried by the filler plug and projecting out of the tank, the outer edge of which stem is threaded for connection with the tube of an ordinary tire pump and further to make the portions of the body of the filler plug which form the valve seat hexagonal in cross section to permit the gripping thereof by a wrench, when it might be necessary to recut the threads upon the outer ends of the hollow stem carried by the plug.

Other objects of the invention will appear in the following detailed description taken in connection with the accompanying drawing, forming a part of this specification, and in which drawing:

Figure 1 is a section through a fuel tank and its delivery tube showing the combined valve and filler plug attached thereto.

Fig. 2 is a vertical section through the combined valve and filler plug.

Fig. 3 is a vertical section through the filler plug and valve taken at right angles to the section shown in Fig. 2.

Fig. 4 is a top plan view of the combined filler plug and valve.

Fig. 5 is a bottom plan of the combined filler plug and valve.

Referring more particularly to the drawings, A indicates the usual fuel retaining tank of a gravity controlled or operated fuel fed system, from which the gasolene or fuel is fed through a tube B to the carbureter C of the engine or motor of an automobile.

In use, when the gasolene, as indicated at D in Fig. 1 of the drawings becomes relatively low in the tank A and the vehicle is ascending an incline, the tilting of the body of the vehicle, will tilt the tank and feed tube B so as to materially interfere with the feed of the gasolene or fuel to the carbureter, usually resulting in the choking of the engine with which the carbureter C is associated, and at such times it is desirable to subject the fuel in the tank A to pressure for forcing it to the carbureter, and to facilitate this application of pressure to the fuel within the tank A, the improved filler plug and valve is designed. The improved combined filler plug and valve 10 comprises the usual plug portion 11 externally threaded for fitting into the opening in the tank A, and having a depending polygonal body portion 12 formed upon its inner surface axially thereof which polygonal portion is provided with a centrally disposed bore 13, the outer portion of which flares toward the lower end of the body 12 to provide a valve seat 14 against which the substantially frusto-conical valve 15 is adapted to seat. The valve cone 15 is provided with a substantially cylindrical extension 16 at the apex thereof which is provided with a transverse slot 17. A pin 18 extends through the opening 17, extending diametrically through the extension 16 and is seated in the body 12 for supporting the valve cone 15 to permit limited movement thereof within the bore 13. A tubular extension 19 is formed integrally with the filler plug 10, being reinforced by diametrically extending webs 20. This tubular extension 19 is provided with an axial bore communicating with the bore 13, and in which the stem 21 of the valve cone 15 projects. The upper end of the tubular extension 19 is threaded as shown at 22, for connection with the tube of an ordinary air compressor tire pump to permit the forcing of air under pressure into the tank A. When the desired pressure is obtained within the tank A, which would be approximately six pounds of pressure, the connection between the combined valve and filler plug and the pump is broken and it may be necessary to tap the tank A with the hand to facilitate the seating of the valve cone 15. However, under normal conditions the pressure of the air against the inner surface or face of the valve cone will be such as to force the valve cone into firm engagement with the seat 14 to prevent the escape of air from the tank. When the air pressure within the tank decreases, and falls below practically a predetermined point, the weight of the valve 15 will cause it to drop or open to allow the escape of air under pressure from within the tank and permitting the fuel feed system to operate in its normal gravity manner. However, in case it is desired to draw the air under pressure from the tank A, before the pressure thereof is reduced sufficiently to allow the unseating of the valve 15, it is only necessary to slightly depress or force inwardly the end of the valve stem 21, which when the valve cone 15 is seated lies flush with the outer end of the tubular extension 19, thus unseating the valve cone and allowing the escape of air from the tank A.

Changes in details may be made without departing from the spirit of this invention, but;

I claim:

1. A filler cap for fuel tanks comprising a body, a depending enlargement formed upon the under surface of the body and provided with a valve seat, a valve cone for seating against said seat, and a stop pin for limiting the movement of said valve cone.

2. A filler cap for the fuel tanks of motor vehicles comprising a body, a depending enlargement formed upon the under surface of the body and provided with a valve seat, a tubular extension formed upon said body and extending upwardly therefrom and being threaded for connection with an air pump tube, a valve cone for seating against said seat, a stem on said valve cone projecting upwardly from the enlargement into the tubular extension.

3. A filler cap for fuel tanks comprising a body, a depending centrally disposed enlargement formed upon the under surface of the body and provided with a valve seat, a tubular extension formed upon said body and extending upwardly therefrom in direct alinement with the enlargement, said extension being threaded for connection with the air pump tube, a valve cone for seating against said seat, a stem on said valve cone projecting upwardly therefrom and the enlargement into said tubular extension and having its upper end flush with the upper end of said extension when the valve cone is seated on the valve seat, whereby, by slight pressure upon the valve stem, the valve cone may be unseated.

4. In a combined filler plug and valve for fuel tanks, a filler plug, a depending body formed upon the under surface of the plug and provided with a valve seat, a valve cone for seating against said seat, a cylindrical extension formed upon the apex of said valve cone and provided with a diametrically extending slot, a pin extending into said body and through said slot for connecting the valve cone to the body to permit limited movement of the valve cone relative to the body.

5. In a combined filler plug and valve for fuel tanks, a filler plug, a depending body formed upon the under surface of the plug and provided with a valve seat, a valve cone for seating against said seat, a cylindrical extension formed upon the apex of said valve cone and provided with a diametrically extending slot, a pin extending into said body and through said slot for connecting the valve cone to the body to permit limited movement of the valve cone relative to the body, a tubular extension formed upon the upper surface of said filler plug and threaded for connection with the tube and pump, a valve stem formed upon said cylindrical extension and projecting upwardly through said tubular extensions, the upper end of said valve stem lying flush with the upper end of the tubular extension when said valve is seated.

6. In a combined filler plug and valve for fuel tanks, a filler plug, a depending body formed upon the under surface of the plug and provided with a valve seat, a valve cone for seating against said seat, a cylindrical extension formed upon the apex of said valve cone and provided with a diametrically extending slot, a pin extending into said body and through said slot for connecting the valve cone to the body to permit limited movement of the valve cone relative to the body, a tubular extension formed upon the upper surface of said filler plug and threaded for connection with the tube and pump, a valve stem formed upon said cylindrical extension and projecting upwardly through said tubular extension, the upper end of said valve stem lying flush with the upper end of the tubular extension when said valve is seated, said depending body being polygonal shaped in cross section.

JOHN L. DOUGHERTY.